(12) United States Patent
Jagannath et al.

(10) Patent No.: US 7,953,096 B2
(45) Date of Patent: May 31, 2011

(54) METHOD AND SYSTEM FOR COMMUNICATION USING A PARTIAL DESIGNATED TRANSIT LIST

(75) Inventors: Sunil Jagannath, Mars, PA (US); Feng Xie, Reston, VA (US); Patrick Dominic-Savio, Cranberry Township, PA (US); David Charlap, Vienna, VA (US)

(73) Assignee: Ericsson AB, Stockholm (SE)

( * ) Notice: Subject to any disclaimer, the term of this patent is extended or adjusted under 35 U.S.C. 154(b) by 1185 days.

(21) Appl. No.: 11/286,485

(22) Filed: Nov. 23, 2005

(65) Prior Publication Data
US 2007/0116003 A1    May 24, 2007

(51) Int. Cl.
*H04L 12/56* (2006.01)
(52) U.S. Cl. ............... 370/395.1; 370/235; 370/236; 370/256; 370/395.2
(58) Field of Classification Search .......... 370/255, 370/389, 395.1, 395.2, 400, 395, 408, 254; 343/742; 318/560; 341/6
See application file for complete search history.

(56) References Cited

U.S. PATENT DOCUMENTS

| | | | | |
|---|---|---|---|---|
| 5,258,855 A * | 11/1993 | Lech et al. | ............... | 358/462 |
| 5,455,495 A * | 10/1995 | Bec | ............... | 318/560 |
| 5,940,396 A * | 8/1999 | Rochberger | ............... | 370/408 |
| 6,111,881 A | 8/2000 | Soncodi | | |
| 6,262,984 B1 * | 7/2001 | Rochberger | ............... | 370/395.2 |
| 6,563,798 B1 * | 5/2003 | Cheng | ............... | 370/255 |
| 6,614,808 B1 * | 9/2003 | Gopalakrishna | ............... | 370/469 |
| 6,697,329 B1 * | 2/2004 | McAllister et al. | ............... | 370/235 |
| 6,717,920 B1 * | 4/2004 | Cheng | ............... | 370/255 |
| 2002/0084940 A1 * | 7/2002 | Dettloff et al. | ............... | 343/742 |
| 2005/0117526 A1 * | 6/2005 | Melnik | ............... | 370/254 |

FOREIGN PATENT DOCUMENTS

EP     0 961 518 A2   12/1999
EP     1 075 112 A1    2/2001

OTHER PUBLICATIONS

The ATM Forum, Private Network0Network Interface Specification, PNNI SWG, Version 1.0, pp. 15-55.*

* cited by examiner

*Primary Examiner* — Robert W Wilson
*Assistant Examiner* — Mohamed Kamara

(57) ABSTRACT

A communication system includes a source PNNI node. The system includes a destination PNNI node. The system includes a network having logical group nodes representing peer groups through which the source node and the destination node communicate by establishing an SPVC using a DTL which identifies the group nodes representing the peer groups with only a partial node ID. A method for communicating includes the steps of forming a DTL which identifies logical group nodes representing peer groups with only a partial node ID. There is the step of establishing an SPVC using the DTL through which a source PNNI node and a destination PNNI node of a network communicate.

10 Claims, 1 Drawing Sheet

METHOD AND SYSTEM FOR COMMUNICATION USING A PARTIAL DESIGNATED TRANSIT LIST

FIELD OF THE INVENTION

The present invention is related to a communication system including a network having logical group nodes for peer groups through which the source node and the destination node communicate by establishing an SPVC using a DTL which identifies the group nodes representing the peer groups. More specifically, the present invention is related to a communication system including a network having logical group nodes for peer groups through which the source node and the destination node communicate by establishing an SPVC using a DTL which identifies the group nodes representing the peer groups with only a partial node ID.

BACKGROUND OF THE INVENTION

An SPVC connection between two endpoints consists of a user configured Permanent Virtual Circuit (PVC) portion and a dynamically established Switched Virtual Circuit (SVC) portion. The path through the network for the SVC portion of the call can be automatically computed using PNNI routing or can be configured a priori by the network administrator. This path, which is referred to as a DTL, comprises the complete list of logical nodes (and possibly logical links) that the connection is to traverse across the network. In a hierarchical PNNI network, a DTL will consist of logical nodes and links at all levels of the hierarchy between the originating and terminating nodes.

A remote transit peer groups in a hierarchically complete DTL is represented by the complete node ID of the Logical Group Node (LGN) representing the peer group in the hierarchy. If the switching system functioning as the Peer Group Leader (PGL) of a remote peer group fails, the node ID of the LGN representing that peer group will change. This will in effect invalidate all DTLs transiting this peer group that were configured by the operator prior to the failure. Any new SPVCs setup using these DTLs will fail possibly resulting in a service impacting outage. Currently, the only way to recover from this situation is for the network administrator to reconfigure all these DTLs to use the node ID of the new LGN representing the peer group in question.

The invention described herein prevents such failures from occurring by changing the way hops are represented in a hierarchical DTL.

SUMMARY OF THE INVENTION

The present invention pertains to a communication system. The system comprises a source PNNI node The system comprises a destination PNNI node. The system comprises a network having logical group nodes representing peer groups through which the source node and the destination node communicate by establishing an SPVC using a DTL which identifies the group nodes representing the peer groups with only a partial node ID.

The present invention pertains to a method for communicating. The method comprises the steps of forming a DTL which identifies logical group nodes representing peer groups with only a partial node ID. There is the step of establishing an SPVC using the DTL through which a source PNNI node and a destination PNNI node of a network communicate.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
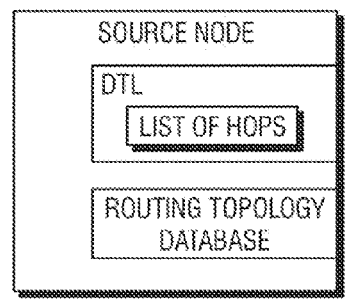
FIG. 1 is a schematic representation of the system of the present invention.

Referring now to the drawings wherein like reference numerals refer to similar or identical parts throughout the several views, and more specifically to FIG. 1 thereof, there is shown a communication system 10. The system 10 comprises a source PNNI node 12. The system 10 comprises a destination PNNI node 14. The system 10 comprises a network 16 having logical group nodes 18 representing peer groups 20 through which the source node and the destination node communicate by establishing an SPVC using a DTL which identifies the group nodes 18 representing the peer groups 20 with only a partial node ID.

Preferably, the partial node ID has only a first n bits of a number of bits of a complete node ID of the logical group nodes 18, where n is an integer less than the number of bits of the complete node ID. All the nodes capable of being elected PGL within each peer group are preferably configured such that the first n bits of their node IDs are identical. Preferably, the DTL has a list of a plurality of hops and the network 16 includes a PNNI hierarchy and n is based on a level of a node associated with a hop of the plurality of hops in the PNNI hierarchy. The number of bits of the complete node ID is preferably 176.

Preferably, the source node has a routing topology data base and replaces the partial node ID with the complete node ID from the routing topology data base. The source node, preferably starting with the list of hops, for each of the hops that are partially specified by the partial node ID, the routing topology data base that has been accumulated from the network 16 is consulted to find a hop that matches the partial node ID specified until a complete DTL with full specified node IDs is constructed. Preferably, the complete DTL is included in a call set up message by the source node before the message is propagated toward the destination node.

The present invention pertains to a method for communicating. The method comprises the steps of forming a DTL which identifies logical group nodes 18 for peer groups 20 with only a partial node ID. There is the step of establishing an SPVC using the DTL through which a source PNNI node 12 and a destination PNNI node 14 of a network 16 communicate.

Preferably, the forming step includes the step of identifying the nodes with only a first n bits of a complete node ID where n is an integer less than a number of bits of the complete ID. There is preferably the step of configuring all the nodes capable of being elected PGL within each peer group such that the first n bits of their node IDs are identical. Preferably, the DTL has a list of a plurality of hops and the network 16 includes a PNNI hierarchy, and including the step of basing n on a level of a node associated with a hop of the plurality of hops in the PNNI hierarchy. The number of bits of the complete node ID is preferably 176.

Preferably, the establishing step includes the step of replacing the partial node ID with the complete node ID from a routing topology data base of the source node. The establishing step preferably includes the step of the source node, starting with the list of hops, for each of the hops that are partially specified by the partial node ID, the routing topology data base that has been accumulated from the network 16 is consulted to find a next hop that matches the partial node ID specified until a complete DTL with fully specified node IDs is constructed. Preferably, the establishing step includes the step of including the complete DTL in a call set up message by the source node before the message is propagated toward the destination node.

In the operation of the invention, network operators routinely use SPVCs for the trunking of their IP/frame relay services. To control the routes chosen for these connections, they configure DTLs for these SPVCs. These DTLs can span multiple peer groups 20.

The technique described herein insulates a configured DTL from peer group leader changes in the PNNI hierarchy caused by network 16 failures. This is accomplished by specifying a partial node ID for LGNs in each row of a DTL.

This scheme enhances the current mechanism for specifying hierarchical DTL hops. It can avoid potential service impacting outages and result in operational cost savings for the service providers. It is likely that this mechanism will become a preferred way of specifying hierarchical DTL hops.

A standard ATM Forum DTL consists of one or more hops between the source and destination PNNI nodes 12, 14. Each hop consists of a node ID, port ID and link type, which could be horizontal link, uplink or last (if the link is the last hop in the DTL). Hops that traverse remote peer groups 20 consist of the LGN node ID, a logical port ID for the LGN horizontal link or uplink and a link type of LGN horizontal link, uplink or last (if the hop is the last one in the DTL).

Figure 2:
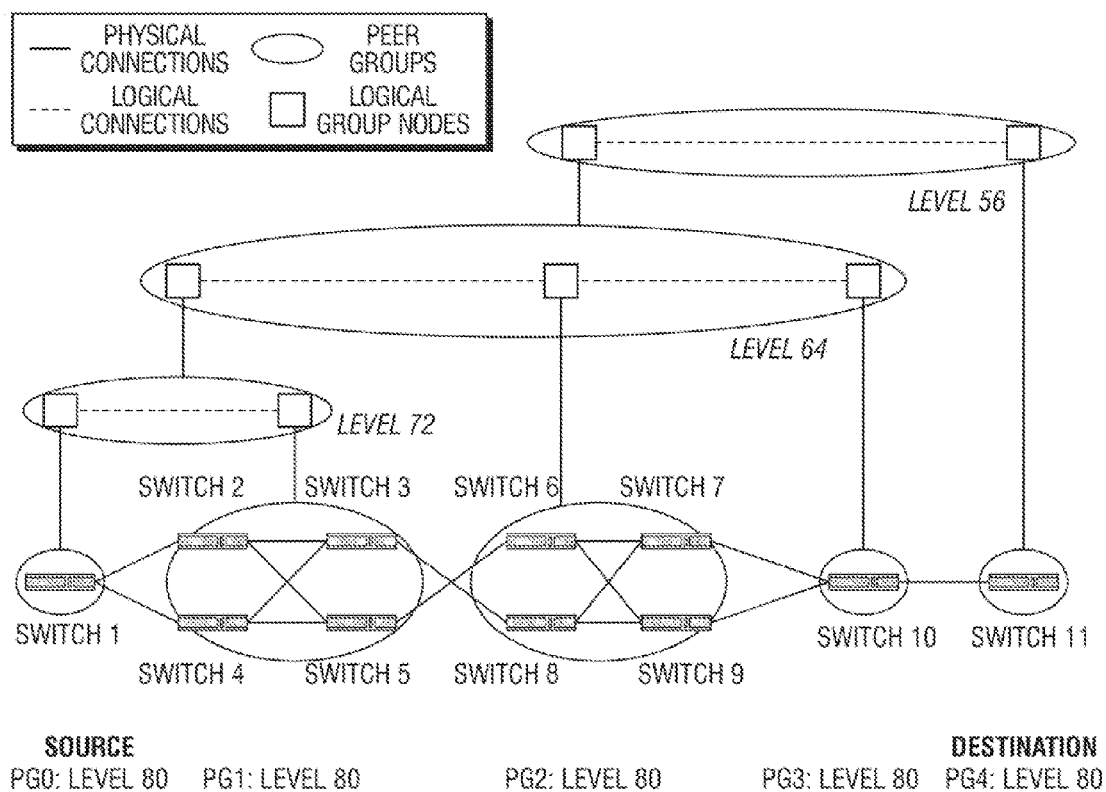
FIG. 2 is a schematic representation of a network topology.

Consider the example network topology shown in FIG. 2.

The DTL for the switched portion of an SPVC from the source to the destination will include the node IDs of the LGNs representing the peer groups 20 labeled PG1, PG2 and PG3 above. Traditionally, these node IDs will be completely specified and 176 bits in length.

Using the technique described here, the operator will configure a special type of DTL in which logical group nodes 18 for PG1, PG2 and PG3 are identified by only the first n bits of their 176-bit node ID. The value of n will be based on the level of the node of the associated hop within the PNNI hierarchy. The DTL hops corresponding to these LGNs are called partial DTL hops because the node IDs in the hops are partially specified. When this DTL is used to route a new SPVC, the routing software will automatically derive the standard ATM Forum DTL from this special DTL by replacing the partial node IDs with the complete node IDs of the logical group nodes 18.

This can be done by consulting the routing topology database, which always reflects the current topology of the network 16. The procedure works by first starting with the user specified list of DTL hops. For each of the hops that are partially specified, the current topology state that has been accumulated by the switching system 10 is consulted to find the node that matches the partial node ID specified. This step is repeated until a complete DTL with fully specified node IDs is constructed. The converted DTL will then be included in the call setup message before it is propagated toward the destination.

In order to apply this technique to the problem described earlier, it would require the network operator to configure the network topology such that all the potential PGLs in each peer group have the same value for the first n bits of their node IDs. By doing this, the partial node ID of the LGN representing each peer group at the next level of the hierarchy will be unchanged irrespective of which lowest level node is PGL. User configured DTLs containing these special DTL hops will thus be insulated from changes in the PGL of remote peer groups 20.

In the example above, and referring to FIG. 2, assume that switch#2 and switch#4 in PG1 are PGL capable (meaning they are configured with non-zero leadership priorities). The node IDs of these nodes must then be configured to have the same first 80 bits. As a result, the first 72 bits of the node ID of the LGN representing PG1 will be constant irrespective of which switch is elected PGL of PG1. A DTL containing a 72 bit partial node ID for the LGN will always remain valid and usable. When such a DTL is used to create an SPVC, the routing software will search the topology database for the LGN matching the partial node ID and replace the 72 bit value with the complete 176 bit node ID in the DTL.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A communication system comprising:
   a source Private Network to Network Interface (PNNI) node;
   a destination PNNI node; and
   a network having logical group nodes representing peer groups through which the source node and the destination node communicate by establishing a Soft Permanent Virtual Circuit (SPVC) using a Designated Transit List (DTL) which identifies the group nodes representing the peer groups with only a partial node ID, the partial node ID having only a first n bits of a number of bits of a complete node ID of the logical group nodes, where n is an integer less than the number of bits of the complete node ID, wherein all nodes to be elected as a Peer Group Leader (PGL) within each peer group are configured such that the first n bits of their node IDs are identical and
   the DTL has a list of a plurality of hops the network including a PNNI hierarchy
   and n is based on a level of a node associated with a hop of the plurality of hops in the PNNI hierarchy.

2. The system as described in claim 1 wherein the number of bits of the complete node ID is 176.

3. The system as described in claim 2 wherein the source node has a routing topology data base and replaces the partial node ID with the complete node ID from the routing topology data base.

4. The system as described in claim 3 wherein the source node, starting with the list of hops, for each of the hops that are partially specified by the partial node ID, the routing topology data base that has been accumulated from the network is consulted to find the hop that matches the partial node ID specified until a complete DTL with full specified node IDs is constructed.

5. The system as described in claim 4 wherein the complete DTL is included in a call set up message by the source node before the message is propagated toward the destination node.

6. A method for communicating comprising the steps of:
   forming a Designated Transit List (DTL) which identifies logical group nodes representing peer groups with only a partial node ID, including the step of identifying the nodes with only a first n bits of a complete node ID where n is an integer less than a number of bits of the complete ID;

establishing a Soft Permanent Virtual Circuit (SPVC) using the DTL through which a source Private Network to Network Interface (PNNI) node and a destination PNNI node of a network communicate; and configuring all the nodes to be elected as a Peer Group Leader (PGL) within each peer group such that the first n bits of their complete node IDs are identical, wherein the DTL has a list of a plurality of hops and the network includes a PNNI hierarchy, and including the step of basing n on a level of a node associated with a hop of the plurality of hops in the PNNI hierarchy.

7. The method as described in claim 6 wherein the number of bits of the complete node ID is 176.

8. The method as described in claim 7 wherein the establishing step includes the step of replacing the partial node ID with the complete node ID from a routing topology data base of the source node.

9. The method as described in claim 8 wherein the establishing step includes the step of the source node, starting with the list of hops, for each of the hops that are partially specified by the partial node ID, the routing topology data base that has been accumulated from the network is consulted to find a next hop that matches the partial node ID specified until a complete DTL with full specified node IDs is constructed.

10. The method as described in claim 9 wherein the establishing step includes the step of including the complete DTL in a call set up message by the source node before the message is propagated toward the destination node.

* * * * *